INVENTOR
WILLIAM V. MEYER

BY

ATTORNEYS

United States Patent Office 2,698,454
Patented Jan. 4, 1955

2,698,454

CASTER DEVICE

William V. Meyer, Milwaukee, Wis.

Application July 8, 1954, Serial No. 442,103

3 Claims. (Cl. 16—32)

My invention relates to wheeled casters and more particularly to casters in which the roller has an operative and an inoperative position to provide either a rolling surface or a fixed support for furniture and the like, as desired.

It has long been recognized that the use of the ordinary roller caster presents certain disadvantages particularly when used with heavy furniture such as pianos, desks and tables. While the ordinary caster is satisfactory for the purpose of providing a rolling support, this type of caster, due to its small bearing area with the floor, is objectionable as a stationary support. The high pressure operating over this relatively small area creates depressions in the floors and floor coverings, particularly if the furniture is permitted to remain long in one position.

Attempts have been made to overcome this problem in the past mainly by inserting wooden or glass cups between the rollers and the floor. While these devices prevent somewhat the formation of the above depressions, they obviously hinder the easy movement of the furniture until the cups are removed. Therefore, other casters have been proposed utilizing means for retracting the casters when the furniture is at rest but these prior devices were unnecessarily complicated or necessitated the manual lifting of the furniture to actuate the caster and to place the latter in the desired operative position.

Therefore, the primary object of my present invention is to provide an improved caster arrangement which will operate automatically to retract the caster when the furniture is at rest but will return the roller to its operative position as the furniture is moved.

Another important object of my invention is to provide a caster device which presents a relatively large area to the floor or floor covering in one position and which will act as a braking action making it suitable for use in hand propelled trucks, carts, etc. particularly when operating on inclines and the like.

A further object of my invention is to provide my wheeled caster with a supporting frame member which will firmly support the object in its rest position but will be automatically released to float freely if the object is rolled or moved on the caster roller.

A still further object of my invention is to provide a simple, practical and reliable construction that is economical to manufacture, easy to assemble and positive in its operation.

With the above and other objects in view, which will more readily become apparent as the nature of the invention is better understood, the same consists in the novel construction, combination and arrangement of parts hereinafter more fully described, illustrated and claimed.

A preferred and practical embodiment of the invention is shown in the accompanying drawings, in which.

Figure 1:
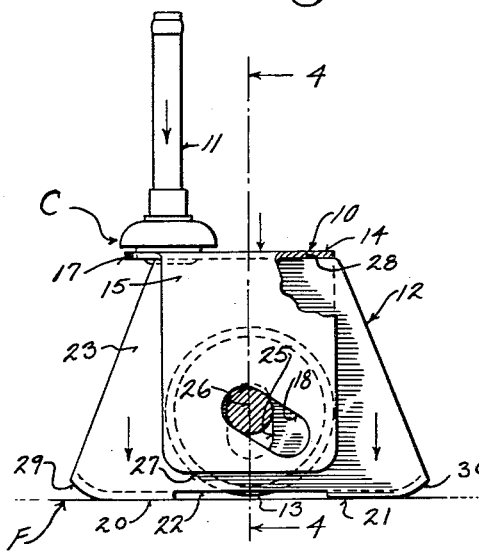
Figure 1 is a side elevational view of my improved caster showing the same in its at rest or inoperative position.

Referring now to the drawings in detail wherein similar reference characters designate corresponding parts throughout the several views, the letter "C" generally indicates one type of my improved caster and the same includes broadly, an outer casing 10 carrying the rotatable stem 11, an inner movable supporting frame 12 and the roller 13. The outer casing 10 includes a strip of metal bent in the shape of an inverted U to provide a flat top plate 14 and depending side plates 15 and 16. The top plate 14 includes a forwardly projecting lip 17. Mounted on the flat plate 14 and lip 17 is the upwardly projecting rotatable stem 11. It should be also noted that each of the depending side plates 15 and 16 is provided with an aligned angularly extending slot 18 and it is to be noted that the slots 18 are located in the lower portions of the depending side plates 15 and 16 respectively and further, that each slot extends downwardly and rearwardly from the center axis of the sides 15 and 16.

Figure 2:
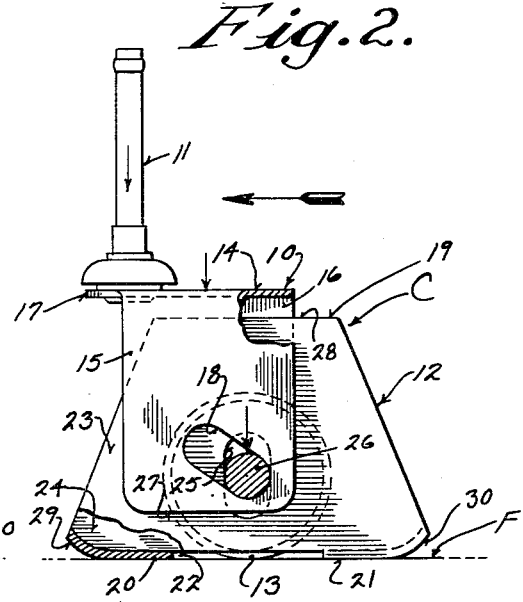
Figure 2 is a side elevational view similar to Figure 1 of the drawings, but illustrating the caster in its operative rolling position, certain parts being broken away to show further details of construction.
Figure 3:
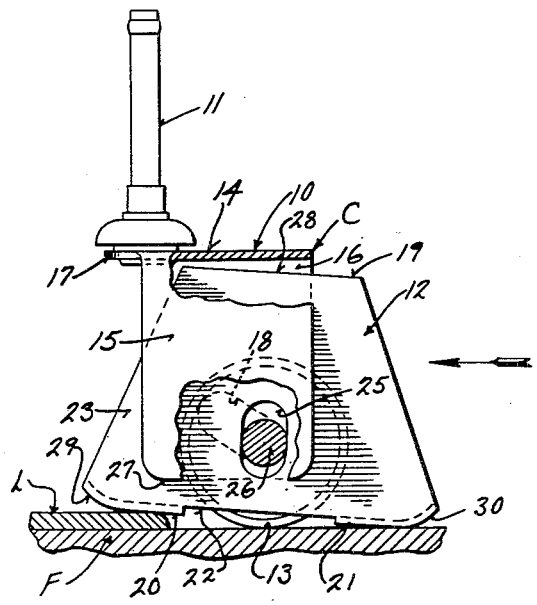
Figure 3 is a side elevational view similar to Figure 2 of the drawings showing my caster in its rolling operative position and illustrating the manner in which it will readily move over obstructions, floor coverings and the like, certain parts being broken away to illustrate details of construction.
Figure 4:
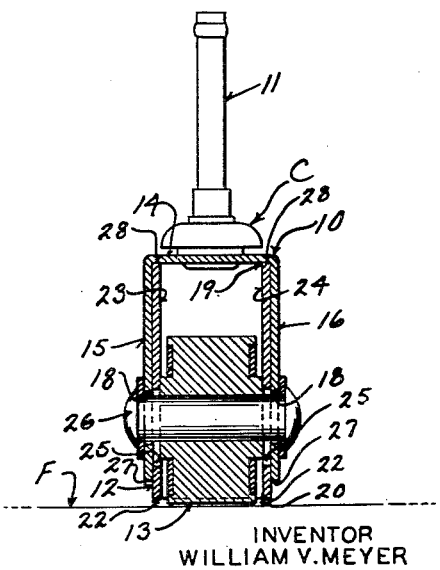
Figure 4 is a transverse vertical sectional view taken on the line 4—4 of Figure 1 and looking in the direction of the arrows.

The inner frame supporting member 12 is also bent U-shaped but is larger in area than the outer casing 10. However, its width is slightly less than the width of the casing 10 and its open upper end 19 is slidably received between the side plates 15 and 16 of the outer casing 10. This inner supporting frame 12 includes the supporting surfaces 20 and 21 of rather large area, an open central portion 22 and upright side members 23 and 24. The side frame members 23 and 24 are each provided with aligned slots 25. The slots 25 are formed in the lower half of the supporting frame member 12 but extend centrally and vertically therein as shown. All of the slots 18 and 25 are arranged in alignment so that the axle 26 of the roller 13 will pass therethrough. The roller 13 is located in alignment with the open central portion 22. It is also to be noted that the lower edges 27 of the side plates 15, 16 of the casing 10 terminate well above the floor contacting or supporting surfaces 20 and 21 of the inner supporting frame 12 and therefore when the caster device "C" is at rest as in Figure 1 of the drawings, the top edges of the open upright side members 23 and 24 will rest on the undersurface of the top plate 14 of the outer casing 10 and in this position, the furniture will be directly supported on the floor surface "F" by means of the flat supporting members 20 and 21 as illustrated by the arrows in Figure 1 of the drawings. This position in Figure 1 also acts as a brake when the movement of the furniture, truck or cart is stopped, particularly on inclines or the like. When the furniture, truck or cart is moved in the direction of the arrows (Figures 2 and 3 of the drawings) it can be seen that the force causes the frame 10 to move upward due to the camming action of the slots 18 in relation to the axle 26. This immediately frees the inner supporting frame 12 so that it no longer carries the weight of the object but the weight is transferred now directly to the axle 26 as indicated by the lines of force in Figure 2 of the drawings. Roller 13 now projecting through the opening 22 carries the weight. In this position, if the object is moved along the frame 12 merely slides or floats along the floor surface "F" offering no resistance whatever to the movement of the object, as the roller 13 is now in direct contact with the floor. It should also be noted that the leading and trailing edges 29 and 30 of the supports 20 and 21 respectively are curved upwardly so that they will easily ride over such obstructions as linoleum, door sills, carpeting, etc. and this is illustrated more particularly in Figure 3 of the drawings in which the lead edge 29 has caused the frame 12 to tilt when riding over a piece of linoleum secured to the floor. Obviously, as soon as the forward movement is stopped, the weight of the object will cause the outer casing 10 to move downward and this automatically raises or cams the axle 26 upward so that it is retracted slightly above the floor surface when the edge 28 of the supporting frame 12 rests firmly on the undersurface of the top plate 14 of the outer casing 10.

Changes in details may be made without departing from the spirit or the scope of this invention, but what I claim as new is:

1. A wheeled caster having an at rest position and a rolling position including, a casing having top and side plates, a supporting frame in slidable engagement with said casing, flat floor engaging surfaces on the bottom portion of said supporting frame, the upper portion of said supporting frame being in direct load supporting engagement with said casing in said at rest position, said casing side plates terminating short of said flat floor engaging surfaces in said rest position, said casing being provided with aligned angularly disposed slots, one of said slots in each side plate, said supporting frame being provided with aligned vertically disposed slots, a roller carrying axle passing through all of said aligned slots, and means associated with said supporting frame for permitting said roller to contact the floor surface in said rolling position.

2. A wheeled caster having an at rest position and a rolling position including, an outer casting having top and side plates, an inner supporting frame slidably received in said outer casing between said side plates, flat floor engaging surfaces on the bottom portion of said supporting frame, the upper portion of said supporting frame engaging the under-surface of said outer casing top plate in said at rest position, said outer casing side plates terminating short of said flat floor engaging surfaces in said rest position, said outer casing being provided with aligned slots, one of said slots in each side plate, said slots being angularly disposed in said casing, said inner supporting frame being provided with aligned vertically disposed slots, a roller carrying axle passing through all of said aligned slots, and means in said supporting frame for permitting said roller to contact the floor surface in the rolling position.

3. An automatically retractable caster providing an upper at rest position and a lower rolling position including, an outer casing having a top plate and depending side plates, an inner supporting frame slidably received in said outer casing between said side plates, flat floor engaging surfaces on the bottom portion of said supporting frame, side members extending upwardly from said flat floor engaging surfaces, said bottom portion of said supporting frame being provided with a centrally disposed opening between said floor engaging surfaces, the upper surface of said supporting frame side members engaging the under-surface of said outer casing top plate in the upper retractable at rest position, said outer casing side plates terminating short of said flat floor engaging surfaces in said rest position, said outer casing being provided with aligned angularly disposed slots, one of said slots in each side plate and each slot having located in the bottom portion of a respective side plate and extending rearwardly and downwardly from its vertical central axis, said inner supporting frame being provided with aligned vertically disposed slots, one of said slots in each side member in the lower portion thereof and centrally thereof, and a roller carrying axle passing through all of said aligned slots, said roller being positioned in said central opening of said supporting frame and being so constructed and arranged as to be retracted above the floor surface in the at rest position when said axle is positioned in the upper portion of the angularly disposed slots and to be lowered to a rolling position when the axle moves downwardly in the angularly disposed slots.

References Cited in the file of this patent

UNITED STATES PATENTS

| Number | Name | Date |
|---|---|---|
| 1,136,915 | Adams | Apr. 27, 1915 |
| 1,145,096 | Thomas | July 6, 1915 |
| 1,730,788 | Simon | Oct. 8, 1929 |
| 2,025,448 | Hebbinghaus | Dec. 24, 1935 |
| 2,358,007 | Henley | Sept. 12, 1944 |